US 12,541,636 B2

(12) United States Patent
Van Den Bossche et al.

(10) Patent No.: US 12,541,636 B2
(45) Date of Patent: Feb. 3, 2026

(54) PCB METAL BALANCING (71) Applicant: ELSYCA N.V., Leuven (BE)

(72) Inventors: Bart Juul Wilhelmina Van Den Bossche, Leuven (BE); Robrecht Lode Florent Belis, Leuven (BE)

(73) Assignee: ELSYCA N.V., Leuven (BE)

( * ) Notice: Subject to any disclaimer, the term of this patent is extended or adjusted under 35 U.S.C. 154(b) by 685 days.

(21) Appl. No.: 17/914,579

(22) PCT Filed: Mar. 25, 2021

(86) PCT No.: PCT/EP2021/057727
§ 371 (c)(1),
(2) Date: Sep. 26, 2022

(87) PCT Pub. No.: WO2021/191346
PCT Pub. Date: Sep. 30, 2021

(65) Prior Publication Data
US 2023/0229843 A1 Jul. 20, 2023

(30) Foreign Application Priority Data

Mar. 26, 2020 (EP) .................................... 20165884

(51) Int. Cl.
G06F 30/398 (2020.01)
G06F 30/3308 (2020.01)
(Continued)

(52) U.S. Cl.
CPC ............ *G06F 30/398* (2020.01); *G06F 30/23* (2020.01); *G06F 30/3308* (2020.01);
(Continued)

(58) Field of Classification Search
CPC .... G06F 30/398; G06F 30/23; G06F 30/3308; G06F 30/367; G06F 2119/18; G06F 2119/22; G06F 2115/12
(Continued)

(56) References Cited

U.S. PATENT DOCUMENTS 4,627,005 A * 12/1986 Doherty .................... G03C 5/02
716/139
8,124,429 B2 * 2/2012 Norman ................. H05K 1/029
257/E23.079

(Continued)

FOREIGN PATENT DOCUMENTS

CN 100455161 C * 1/2009 ......... G06F 17/5036
CN 100505987 C * 6/2009
(Continued)

OTHER PUBLICATIONS

Japanese Office Action from corresponding JP Application No. 2022-557704, Dec. 16, 2024.
(Continued)

*Primary Examiner* — Phallaka Kik
(74) *Attorney, Agent, or Firm* — Workman Nydegger (57) ABSTRACT Example embodiments describe a computer-implemented method for balancing an electrochemical deposition of metal on a PCB substrate; the method including i) obtaining a layout of the metal on the PCB substrate comprising at least one active area having a circuit layout and a balancing area available for the balancing; ii) dividing the substrate area in a plurality of finite elements; iii) determining active metal fractions from the layout for the respective finite elements; iv) determining metal balancing fractions covering respective finite elements in the balancing area based on the active metal fractions in finite elements in the at least one active area surrounding the respective finite element.

12 Claims, 7 Drawing Sheets (51) Int. Cl.
*G06F 30/367* (2020.01)
*G06F 30/23* (2020.01)
*G06F 115/12* (2020.01)
*G06F 119/18* (2020.01)
*G06F 119/22* (2020.01)

(52) U.S. Cl.
CPC ........ *G06F 30/367* (2020.01); *G06F 2115/12* (2020.01); *G06F 2119/18* (2020.01); *G06F 2119/22* (2020.01)

(58) Field of Classification Search
USPC ................ 716/137, 54, 55; 703/14; 439/55, 439/620.01; 438/8
See application file for complete search history.

(56) References Cited

U.S. PATENT DOCUMENTS

| | | | | |
|---|---|---|---|---|
| 8,464,201 | B2* | 6/2013 | Huang | G06F 30/367 716/120 |
| 9,715,571 | B1* | 7/2017 | Rath | G06F 30/20 |
| 9,817,938 | B2* | 11/2017 | Jeevan | G06F 30/392 |
| 12,320,028 | B2* | 6/2025 | Takshi | C25D 17/10 |
| 2005/0008319 | A1* | 1/2005 | Cameron | G06F 30/00 716/136 |
| 2005/0086616 | A1* | 4/2005 | Wang | G06F 30/00 716/135 |
| 2006/0118328 | A1* | 6/2006 | Wang | H05K 3/241 174/250 |
| 2011/0314669 | A1 | 12/2011 | Stamper et al. | |
| 2013/0007690 | A1* | 1/2013 | Huang | G06F 30/367 716/133 |
| 2014/0151797 | A1* | 6/2014 | Lotfi | H10D 84/856 257/338 |
| 2014/0262475 | A1* | 9/2014 | Liu | H01L 21/4817 174/377 |
| 2014/0367160 | A1* | 12/2014 | Yu | H01L 21/7684 174/377 |
| 2016/0254168 | A1* | 9/2016 | Liu | H01L 21/486 438/107 |
| 2023/0026067 | A1* | 1/2023 | Caprio | H05K 3/0047 |
| 2024/0378367 | A1* | 11/2024 | Tai | G06F 30/392 |

FOREIGN PATENT DOCUMENTS

| | | | | |
|---|---|---|---|---|
| CN | 109284524 | A | 1/2019 | |
| EP | 3439066 | A1 * | 2/2019 | ........... C23C 14/042 |
| GB | 2573767 | A * | 11/2019 | ............. B33Y 10/00 |
| JP | H04350772 | A | 12/1992 | |
| JP | 2004088102 | A | 3/2004 | |
| JP | 2014010582 | A | 1/2014 | |

OTHER PUBLICATIONS

Search Report from corresponding European Application No. 20165884. 6, Sep. 30, 2020.
International Search Report from PCT Application No. PCT/EP2021/ 057727, Jun. 23, 2021.
Fredenberg, "Electroplating Simulations for Printed Circuit Board Designers," COMSOL Blog, Dec. 17, 2014, 7 pages.
Hander et al., "Challenges of ECD panel fan-out in high volume and potential solutions," Chip Scale Review, Jan. 1, 2018, vol. 22, No. 1, 8 pages.

* cited by examiner

PCB METAL BALANCING

TECHNICAL FIELD

Various example embodiments relate, amongst others, to the balancing of an electrochemical deposition of metal on a PCB substrate.

BACKGROUND

A printed circuit board, PCB, typically comprises an electrically conducting circuit according to a certain layout that is provided onto a non-conductive layer or substrate. One way to manufacture a PCB is by an additive or semi-additive process wherein a conductive metal, e.g. copper, is electroplated onto the substrate according to the layout, i.e. by the electrochemical deposition of such metal on the substrate. Typically, different PCB layouts are arranged together on a so-called panel with standard dimensions thereby obtaining a panel layout. When the panel has undergone the electroplating, the different PCBs are cut out from the panel.

The electrical current density on a panel will not be uniform but will vary within the PCB circuitries and between the different PCB circuits. Moreover, due to the different shapes, empty spaces, i.e. areas with no metal, will appear in between the PCBs on the panel. Due to such non-uniformities in metal deposition, the final thickness of the deposited metal will vary throughout the panel area. This may lead to rejected panels when the metal layer is too thick or thin in some locations.

This issue may be resolved by metal balancing of the PCB layout or panel layout, i.e. by the introduction of dummy metal patterns to obtain a more uniform metal concentration. One way to do this is by manual or automated insertion of uniform dot or raster patterns in areas that are not used, typically areas in between the PCBs on the panel.

A problem with this way of balancing is that it does not necessarily result in the best thickness distribution throughout the panel, mainly because of the large variation in metal concentration between the different PCBs.

SUMMARY

The scope of protection sought for various embodiments of the invention is set out by the independent claims.

The embodiments and features described in this specification that do not fall within the scope of the independent claims, if any, are to be interpreted as examples useful for understanding various embodiments of the invention.

It is an objection of the present disclosure to overcome the above identified problem by providing an automated solution for balancing a PCB layout that results in a more optimal metal thickness in the active areas.

This object is achieved, according to a first example aspect of the present disclosure, by a computer-implemented method for balancing an electrochemical deposition of metal on a PCB substrate; the method comprising:
- obtaining a layout of the metal on the PCB substrate comprising at least one active area having a circuit layout and a balancing area available for the balancing;
- dividing the substrate area in a plurality of finite elements;
- determining active metal fractions from the layout for the respective finite elements;
- determining metal balancing fractions covering respective finite elements in the balancing area based on the active metal fractions in finite elements in the at least one active area surrounding the respective finite element.

In other words, an optimal metal balancing is achieved by a finite element method wherein an optimal metal balancing fraction is determined for the finite elements in the balancing area. Such a metal fraction may be understood as a density of the metal in the respective element, e.g. as a percentage of the element area that is to be covered by metal. For determining the metal balancing fractions, the active metal fractions for the finite elements in the active areas are determined, i.e. the density of metal in these finite elements. The metal balancing fraction for a certain finite element in the balancing area is then based on the active metal fraction of surrounding finite elements. Therefore, a balancing element close to an active area with high active metal fractions will get a different balancing fraction than when it is closer to an active area with lower active metal fractions. As a result, balancing fractions will vary throughout the balancing area thereby influencing the thickness of the resulting metal layer in the surrounding active area in an optimal way. This further results in a smaller final thickness range when manufacturing the PCB and thus a better end product.

The layout may correspond to a panel layout comprising a plurality of PCB layouts arranged within the dimensions of the panel. The active area may then comprise the PCB areas. The active area may further include other metal structures foreseen on the panel such as testing coupons or metal borders. The balancing areas may then correspond to the metal-free areas between the PCB areas or a sub-set of these metal-free areas for which balancing is available. The above method may also be performed on a layout of a single PCB layout, e.g. during the PCB design and before it is placed on such a panel. In such case, the balancing areas may be defined as metal-free areas within the circuitry defined by the PCB layout.

The so-obtained metal balancing fractions may then be used to adapt the layout in the balancing area according to the determined metal balancing fractions. This may for example be done by selecting patterns for the finite elements in the balancing area having the respective metal balancing fractions and then adding the patterns to the layout of the PCB panel.

According to an embodiment, determining the balancing fractions is performed such that a lower active metal fraction for a respective surrounding finite element in the active area contributes more to the metal balancing fraction than a higher active metal fraction.

By foreseeing a higher metal balancing fraction near lower active metal fractions, the metal thickness of that active metal fraction will be reduced. Vice versa, by foreseeing a lower metal balancing fraction near higher active metal fractions, the metal thickness of that active metal fraction will be increased. This way, the resulting thickness range of the active metal will be decreased.

According to an embodiment determining the balancing fractions is performed such that a respective surrounding finite element in the active area contributes less to the metal balancing fraction the larger its distance to the respective finite element in the balancing area.

This way, the physical decaying effect of the metal balancing for active areas that are further away is taken into account. In other words, a distance function that decreases with increasing distance is applied to the metal balancing fraction.

According to an example embodiment, determining the balancing fractions is performed such that a respective surrounding finite element in the active area contributes more to the balancing fraction when the respective finite element in the balancing area is located closer to a border of the panel When an active area is close to a border of the layout it will have less elements nearby for metal balancing. This effect is overcome by increasing the metal balancing for such areas. As a result, the resulting metal thickness range is optimized in the same way as for active areas in the middle of the layout.

According to example embodiments, the method further comprising:

simulating an average thickness of the metal covering the finite elements when performing the electrochemical deposition according to the obtained PCB panel layout; and wherein determining the balancing fractions is performed such that a higher simulated average thickness of the metal in a respective surrounding finite element in the active area contributes more to the balancing fraction than a smaller simulated average thickness.

In other words, the active metal fraction is used as input for simulating the resulting thickness without metal balancing. This thickness can be obtained as it is related to the active metal fraction and the process parameters of the electrochemical deposition. As the ultimate goal of the balancing is keeping the metal thickness within a certain range, the simulated thickness provides a good input for the balancing, i.e. when the metal is too thick in a certain location, the balancing fraction is increased in the nearby balancing area.

According to example embodiments, the method further comprises:

simulating an average optimized thickness of the metal covering the finite elements when performing the electrochemical deposition for the PCB layout according to the determined balancing fractions;

adapting process parameters of the electrochemical deposition such that the average optimized thickness of the metal falls within a predetermined thickness range.

The obtained metal balancing will have an effect on the thickness range of the resulting metal layer. This decreased range can further be exploited to shift the range to a more preferred average by adapting the process parameters of the electrochemical deposition.

According to an example embodiment, determining the balancing fractions is performed such that a respective surrounding finite element in the active area contributes less to the balancing fraction when more surrounding finite elements in the balancing area are available.

In other words, the total metal balancing for a certain element in the active area is spread over the available balancing elements. This results in an optimal use of the balancing area and avoids having balancing fractions that are too high in a certain balancing area.

According to a second example aspect, a method is disclosed for manufacturing a PCB panel by electrochemical deposition of a metal comprising:

determining a layout of the PCB panel comprising at least one active area having a circuit layout and a balancing area available for balancing of the material;

balancing the layout by the method according to any one of claims 1 to 9;

manufacturing the PCB panel accordingly.

According to a third example aspect a controller is disclosed comprising at least one processor and at least one memory including computer program code, the at least one memory and computer program code configured to, with the at least one processor, cause the controller to perform the method according to the first example aspect.

According to a fourth example aspect, a computer program product is disclosed comprising computer-executable instructions for causing a device to perform at least the method according to the first example aspect.

According to a fifth example aspect, a computer readable storage medium is discloses comprising computer-executable instructions for performing the method according to the first example aspect when the program is run on a computer.

BRIEF DESCRIPTION OF THE DRAWINGS

Some example embodiments will now be described with reference to the accompanying drawings.

DETAILED DESCRIPTION OF EMBODIMENT(S)

Various example embodiments relate, amongst others, to the balancing of the electrochemical deposition of metal on a PCB substrate. Such electrochemical deposition may be performed by an additive process wherein a conductive metal, e.g. copper, is electroplated onto the substrate according to the layout, i.e. by the electrochemical deposition of such metal on the substrate. To this purpose, the substrate may be made conductive according to the layout and submerged into a plating bath with the dissolved metal ions. A current is then forced from and anode to the conductive substrate serving as the cathode such that the metal is deposited onto the substrate. By selecting the process parameters such as the amount of current and process time, a metal layer of a certain thickness according to the layout is obtained on the substrate. Different PCB layouts may be arranged together on a so-called panel with standard dimensions thereby obtaining a panel layout. When the panel has undergone the electroplating, i.e. the electrochemical deposition of the metal, and a series of subsequent process steps, the different PCBs may be cut out from the panel. The plated metal thickness on a panel may not be uniform but will vary within the PCB circuitries and between the different PCB circuits. Moreover, due to the different shapes, empty spaces, i.e. areas with no metal, will appear in between the PCBs on the panel. Due to such non-uniformities in metal deposition, the final thickness of the deposited metal may vary throughout the panel area. This issue may be resolved by metal balancing of the PCB layout or panel layout, i.e. by the introduction of dummy metal patterns to obtain a more uniform metal distribution.

Figure 1:
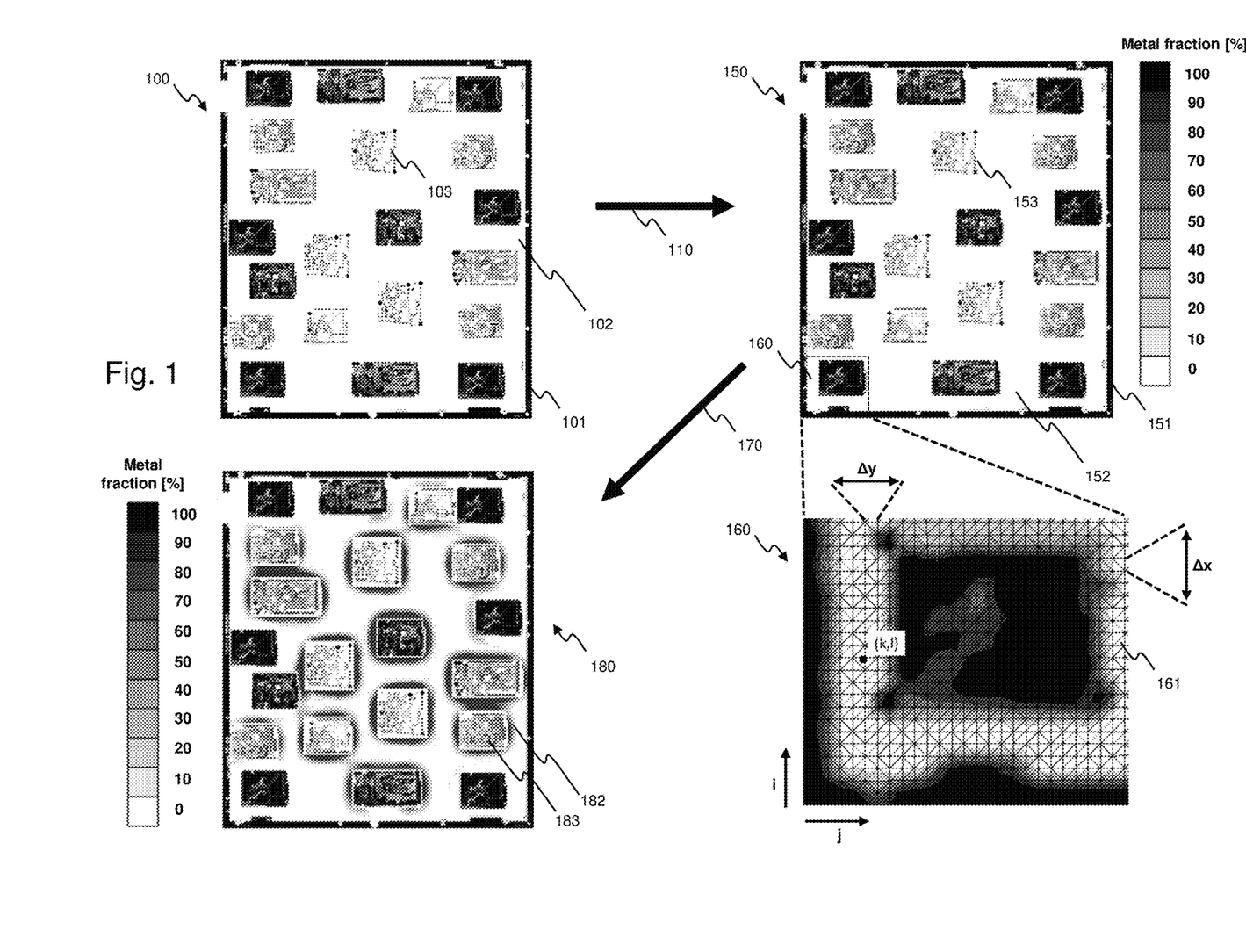
FIG. 1 shows different plots of a PCB panel when performing balancing according to example embodiments.

FIG. 1 illustrates different steps 110, 170 for performing such balancing starting from a layout 100. In this example, layout 100 defines a conductive metal pattern that is to be deposited on a complete panel substrate. The layout 100 comprises a plurality of PCB layouts 103 arranged within the dimensions of the panel. The layout 100 may further comprise other metal patterns such as testing coupons and metal borders 101. All these metal patterns together form the active metal area of the layout. These active areas are excluded for metal balancing. Layout 100 further comprises empty areas 102, i.e. areas for which no metal pattern has been defined. These are primarily the areas 102 in between the different PCB layouts 103. Such areas or a selection of such areas may be available for metal balancing, i.e. for the addition of dummy metal patterns serving the purpose of influencing the electromechanical deposition of the metal within the active areas. Areas 102 available for metal balancing are further referred to as balancing areas. More particular, such balancing is performed to narrow the thickness range of the deposited metal in the active areas 103.

In a step 110, the active metal fraction is determined for the layout 100. To this purpose, the area occupied by the substrate is divided into a plurality of finite elements 161 and for each of these elements the metal fraction is derived from the layout 100, i.e. each element is assigned with a metal fraction value indicative of the fraction of the element's area that is covered by metal in the layout 100. In the example of FIG. 1, one element is defined by a right-angled triangle 161 with legs sized $\Delta x$ and $\Delta y$. These resulting metal fractions 151, 153 are illustrated in plot 150 for the layout 100. Plot 160 shows an enlarged view of the lower left section of the plot 150 with the triangular finite elements projected on top. The determined active metal fraction may then be represented as $\theta_a(i, j)$ with $i=1 \ldots n$ and $j=1 \ldots m$ discrete coordinates along the respective vertical and horizontal axis as defined by the plot 150.

Then, in the next step 170, a balancing metal fraction $\theta_b(k, l)$ is determined for the elements in the balancing area based on the active metal fractions of elements surrounding that element. In other words, the balancing metal fraction $\theta_b(k, l)$ in a certain location k, l is based on all the active fractions $\theta_a(i, j)$, i.e. $\theta_b(k, l) = f_b(\theta_a(i, j))$ for $i=1 \ldots n$ and $j=1 \ldots m$ wherein a fraction $\theta_a(i, j)$ contributes less to the metal balancing fraction $\theta_b(k, l)$ the larger its distance to the balancing fraction $\theta_b(k, l)$. The result of step 170 is shown in plot 180 where the resulting metal fractions $\theta(i, j)$ are shown, i.e. $\theta_a(i, j)$ 183 for the active areas and $\theta_b(k, l)$ 182 for the balancing areas.

Different further example embodiments for determining the balancing metal fractions from the active metal fraction, i.e. for defining the function $f_b$ will now be described. To this purpose, the following variables and functions are defined.

$C_a(k, l)$ is defined as the environmental contribution of active metal fractions from other elements to the element (k, l) that is available balancing and is defined as follows:

$$C_a(k, l) = \sum_{i=1}^{n} \sum_{j=1}^{m} \frac{\theta_a(i, j)}{\delta(i, j, k, l)} \quad \text{(Eq. 1)}$$

wherein $\delta(i, j, k, l)$ is a distance function that increases with increasing distance between a balancing element (k, l) and active element (i, j). This way, the closer the active element, the larger the environmental contribution. Examples of distance functions are $$\delta(i, j, k, l) = r^p \quad \text{(Eq. 2)}$$

$$\delta(i, j, k, l) = \ln(r) \quad \text{(Eq. 3)}$$

and wherein p is a power parameter greater than zero and r is the distance between element (k, l) and element (i, j):

$$r = \sqrt{(i-k)^2 \Delta x^2 + (j-l)^2 \Delta y^2} \quad \text{(Eq. 4)}$$

In this disclosure, the term 'surrounding' refers to this distance function to indicate that elements contribute more to a certain variable related to a target element the closer these elements are to this target element.

$E(k, l)$ is defined as the density of elements around element (k, l):

$$E(k, l) = \sum_{i=1}^{n} \sum_{j=1}^{m} \frac{1}{\delta(i, j, k, l)} \quad \text{(Eq. 5)}$$

$E(k, l)$ is therefore larger for cells that are closer to the edge of the substrate and, hence, have fewer surrounding cells.

$D(k, l)$ is the environmental concentration of elements that are available for copper balancing around element (k, l):

$$D(k, l) = \sum_{i=1}^{n} \sum_{j=1}^{m} \frac{B(i, j)}{\delta(i, j, k, l)} \quad \text{(Eq. 6)}$$

with $B(i, j)=1$ when element (i, j) is an element that is allowed for balancing, otherwise $B(i, j)=0$. For example, there may be areas that are excluded within a certain distance from an active area of for any other reason.

$F(k, l)$ is defined as the density of active elements around an element (k, l):

$$F(k, l) = \sum_{i=1}^{n} \sum_{j=1}^{m} \frac{P(i, j)}{\delta(i, j, k, l)} \quad \text{(Eq. 7)}$$

with $P(i, j)=1$ when element (i, j) is an element within an active area, otherwise $P(i, j)=0$.

$G(k, l)$ is the environmental contribution of surrounding active metal fractions on the current element (k, l):

$$G(k, l) = \sum_{i=1}^{n} \sum_{j=1}^{m} \frac{\theta(i, j) \cdot P(i, j)}{\delta(i, j, k, l)} \quad \text{(Eq. 8)}$$

$T(k, l)$ is defined as the environmental contribution from active elements based on the deviation from the target metal thickness $d_T$:

$$T(k, l) = \sum_{i=1}^{n} \sum_{j=1}^{m} \frac{\frac{(d(i, j) - d_T)}{d_T} \cdot \theta_a(i, j) \cdot P(i, j)}{\delta(i, j, k, l)} \quad \text{(Eq. 9)}$$

$$T(k, l) = W(k, l)/d_T - G(k, l) \quad \text{(Eq. 10)}$$

$$W(k, l) = \sum_{i=1}^{n} \sum_{j=1}^{m} \frac{d(i, j) \cdot \theta_a(i, j) \cdot P(i, j)}{\delta(i, j, k, l)}; \quad \text{(Eq. 11)}$$

Wherein $d(i, j)$ is the thickness of the metal for element (i, j) when no balancing is applied. By the factor $(d(i, j) - d_T)$, the environmental contribution thus takes into account the deviation of the simulated thickness from the target metal thickness $d_T$. This deviation may also be referred to as the amount of underplating or overplating of the deposited metal. By the multiplication with the actual active metal fraction $\theta_a(i, j)$, the so-obtained contribution $T(k, l)$ is also proportional with the metal fraction of the surrounding active elements.

Figure 2:
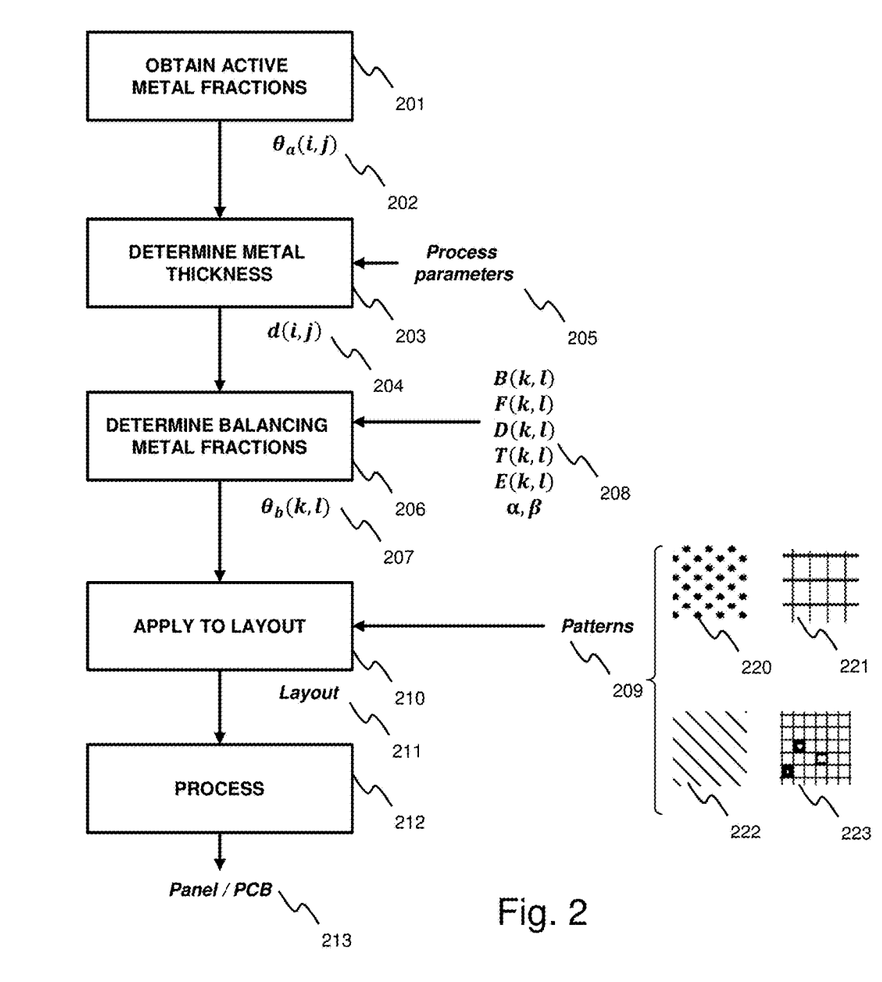
FIG. 2 shows steps performed for balancing a layout according to an example embodiment.

FIG. 2 illustrates steps for performing balancing according to an example embodiment using the above obtained equations. According to a first step 201, the active metal fractions $\theta_a(i, j)$ 202 are obtained from a certain metal layout as already described above with reference to FIG. 1. Then, in a next step 203, the metal thickness $d(i, j)$ 204 in the active areas is calculated, i.e. the thickness of the metal when applied by electrochemical deposition onto the substrate under the process parameters 205.

Then, in step 206, the balancing metal fractions $\theta_b(k, l)$ 204 are determined from the determined thickness 204 and environmental contributions and parameters 208. Step 206 may for example be performed according to the following equation:

$$\theta_b(k, l) = B(k, l)\alpha \frac{F(k, l)}{E(k, l)} f\left(\beta \frac{T(k, l)}{E(k, l)}\right);$$ (Eq. 12)

wherein $\alpha$ and $\beta$ are adjustable parameters and $f(x)$ is a delimiter function which may be defined as:

$$\begin{cases} -1 & \text{if } x < 0 \\ x & \text{if } 0 < x < 1 \\ 1 & \text{if } x > 1 \end{cases}$$ (Eq. 13)

According to this Eq. 12, the balancing metal fraction in a balancing element is based on $B(k, l)$, i.e. balancing will only be performed when metal balancing is allowed for this element. Furthermore, the balancing fraction in a balancing element is based on the density $F(k, l)$ of surrounding active elements such that the more dense an active area surrounding the balancing element is, the higher the balancing metal fraction becomes. In other words, the more active elements surrounding the balancing elements, the higher the resulting metal fraction. The density of active elements $F(k, l)$ is further divided by the density $E(k, l)$ of elements surrounding the element $(k, l)$, such that the effect of $F(k, l)$ on the balancing will be higher the closer the element $(k, l)$ is to the border of the substrate. Finally, the balancing fraction of element $(k, l)$ is dependent on the actual environmental contribution $T(k, l)$ of the surrounding active elements, again weighted by the density $E(k, l)$.

Alternatively, step 206 may be performed according to the following equation:

$$\theta_b(k, l) = B(k, l)\alpha \frac{F(k, l)}{D(k, l)} f\left(\beta \frac{T(k, l)}{E(k, l)}\right);$$ (Eq. 14)

wherein $\alpha$ and $\beta$ are again adjustable parameters and $f(x)$ is the delimiter function according to Eq. 13. The difference with Eq. 12 is that the density of surrounding active elements is now divided by the environmental concentration $D(k, l)$ of elements that are available for copper balancing around element $(k, l)$. In other words, the more balancing elements surrounding the element $(k, l)$ are available, the lesser the actual balancing fraction that is assigned to the element $(k, l)$.

Then, in step 210, the obtained balancing fractions $\theta_b(k, l)$ are applied to the initial layout, i.e., for a balancing element $(k, l)$ a layout pattern 209 is selected having the respective balancing fraction $\theta_b(k, l)$ and added to the layout. These patterns may be automatically generated such that they have the respective balancing fraction $\theta_b(k, l)$. For example, a dotted pattern 220 may be used wherein the radius of the dots changes according to the balancing fraction $\theta_b(k, l)$. Another way for generating the patterns is by defining a line pattern 221, 222 wherein the line thickness and/or line spacing changes according to the balancing fraction $\theta_b(k, l)$. Yet another way is to start from a rectangular background pattern 223 having a minimum metal fraction, e.g. 0.05, and to add metal to each of the rectangles according to the balancing fraction $\theta_b(k, l)$. Balancing fractions $\theta_b(k, l)$ 207 may further be limited between a minimum and maximum balancing fraction, e.g. between 0.05 and 0.8.

When the balancing is added to the layout, the so-obtained layout 211 may be used for the electrochemical deposition 212 of the metal to a substrate thereby obtaining a panel or PCB 213 with the deposited metal.

Figure 3:
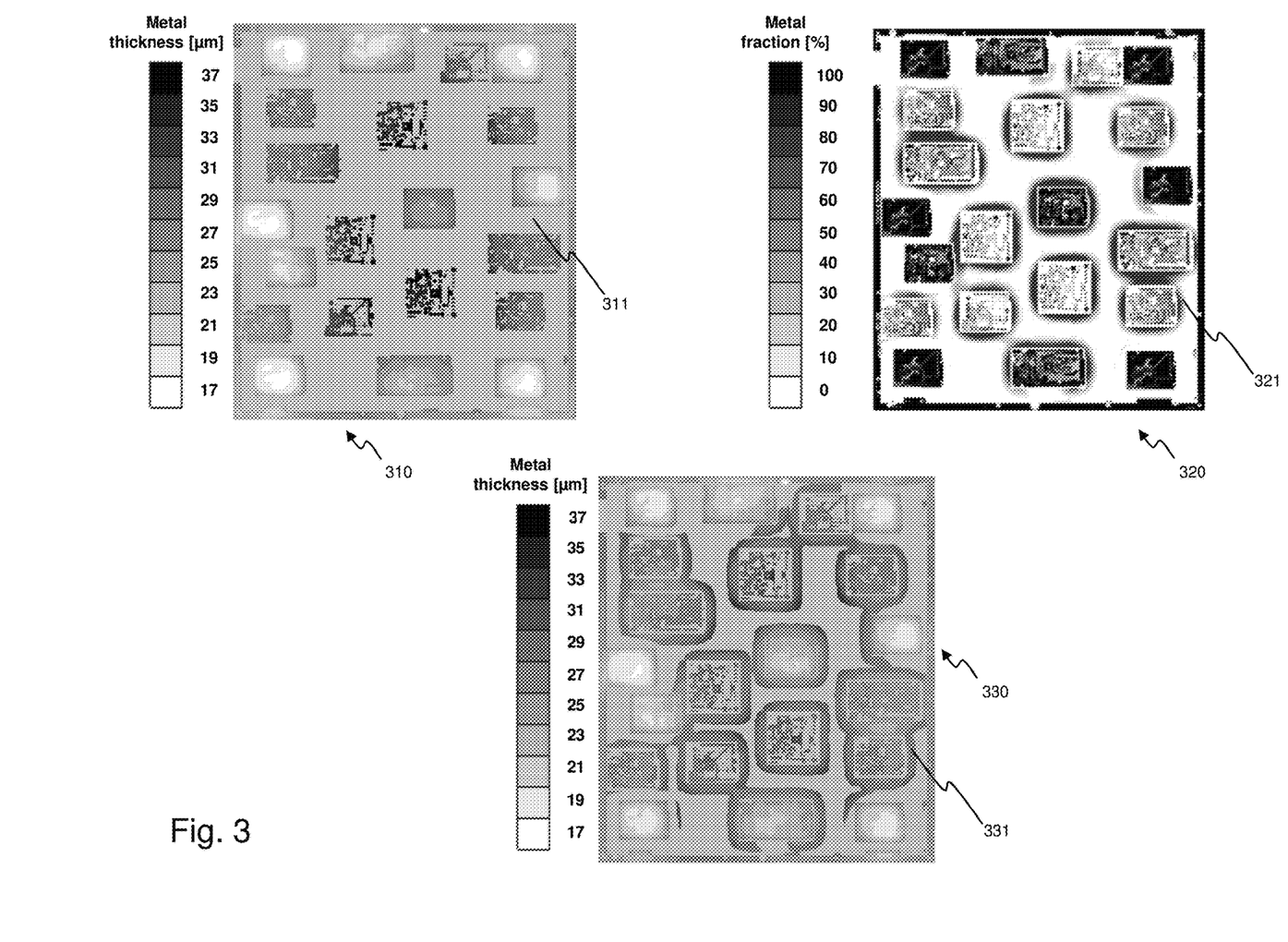
FIG. 3 shows plots of a PCB panel illustrating the balancing steps according to FIG. 2.

FIG. 3 illustrates different plots 310, 320, 330 as a result of the application of the steps according to FIG. 2 starting from the layout 100 as shown in FIG. 1. For this application, Eq. 12 was applied with $\alpha=300$ and $\beta=1$. Plot 310 shows the simulated thickness 204 as obtained from step 203. The uniform areas 311 are areas with no metal at all, thus having no thickness values. This plot 310 shows that the metal thickness in the active areas ranges from 17 μm to 37 μm when no metal balancing is applied. Plot 320 shows the balancing fractions $\theta_b(k, l)$ 207, 321 after application of step 206. Plot 330 shows the simulated thickness 204 after application of the balancing fractions $\theta_b(k, l)$ to the layout. By the application of metal balancing 331 to the balancing areas, metal deposition is now observable in these balancing areas. As a result of the metal balancing, the metal thickness range was decreased to a range of 19 μm to 31 μm in almost all active areas.

Figure 4:
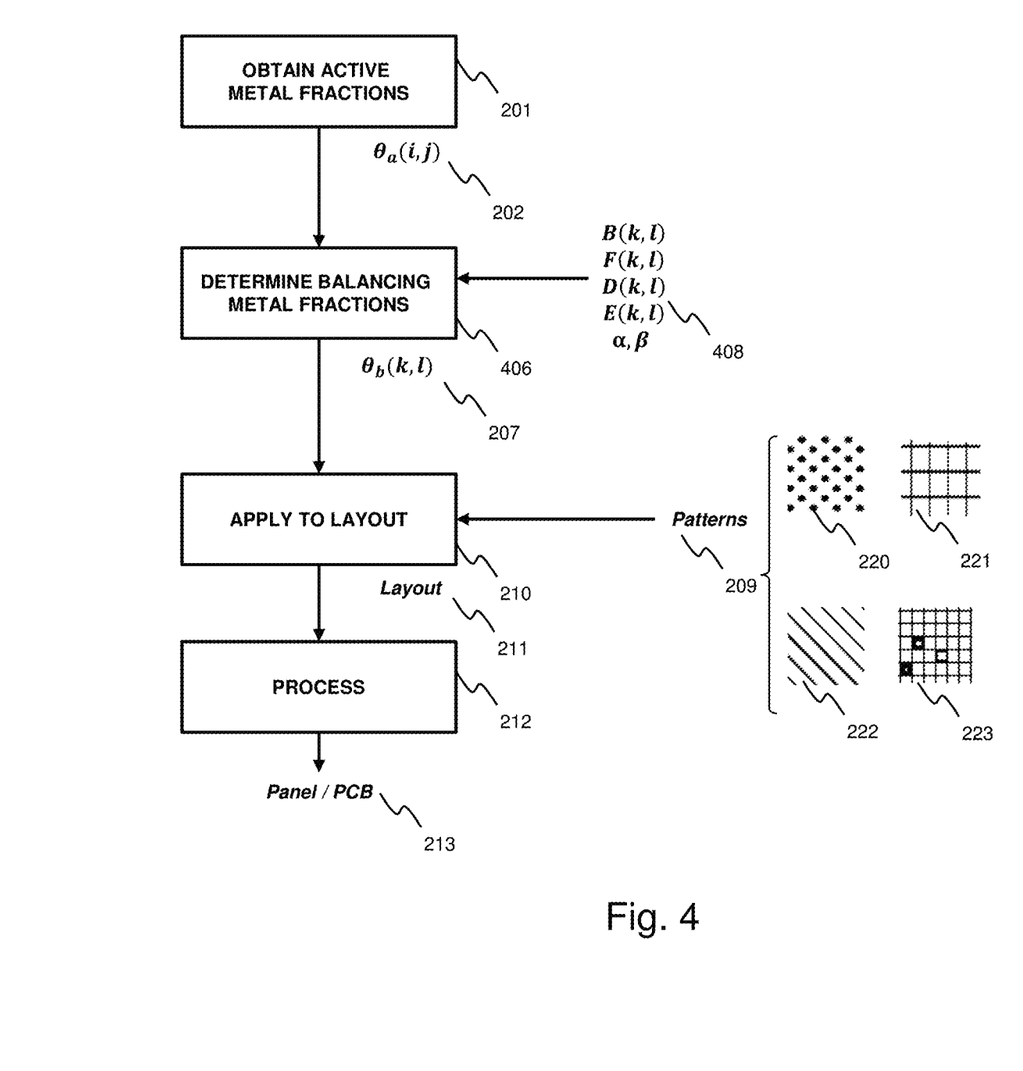
FIG. 4 shows steps performed for balancing a layout according to another example embodiment.

FIG. 4 illustrates steps for performing balancing according to another example embodiment. Most of the steps according to FIG. 4 may be the same as those according to the steps of FIG. 2. In such case, the same reference numbers have been used. Only where the steps are different, new reference numbers have been used. The main difference between FIG. 2 and FIG. 4 is that the step 203 of simulating the metal thickness is omitted and that the balancing fractions 207 are now determined directly from the active metal fractions 202.

Step 406 may for example be performed according to the following equation:

$$\theta_b(k, l) = B(k, l)\alpha \frac{F(k, l)}{E(k, l)} f\left(1 - \beta \frac{G(k, l)}{E(k, l)}\right)$$ (Eq. 15)

The difference with above Eq. 12 is that now the environmental contribution $G(k, l)$ of surrounding active metal fractions on the current element $(k, l)$ is now used instead of the environmental contribution $T(k, l)$ from active elements based on the deviation from the target metal thickness $d_T$. As the higher the surrounding active metal fractions are, the lower the thickness of the deposited metal will be. The environmental contribution $G(k, l)$ may therefore be considered a good parameter for determining the balancing fraction.

Alternatively, step 406 may be performed according to the following equation:

$$\theta_b(k, l) = B(k, l) \alpha \frac{F(k, l)}{E(k, l)} f\left(1 - \beta \frac{C(k, l)}{E(k, l)}\right) \quad \text{(Eq. 16)}$$

The difference with the above Eq. 15 is that now the environmental contribution G (k, l) of surrounding active metal fractions on the current element (k, l) is replaced by C (k, l) which lacks the parameter P (i, j).

Similar to Eq. 14 the density E(k, l) of elements surrounding the element (k, l) may be replaced by the environmental concentration D (k, l) of elements that are available for copper balancing around element (k, l) thereby obtaining the following equations:

$$\theta_b(k, l) = B(k, l) \alpha \frac{F(k, l)}{D(k, l)} f\left(1 - \beta \frac{G(k, l)}{E(k, l)}\right) \quad \text{(Eq. 17)}$$

$$\theta_b(k, l) = B(k, l) \alpha \frac{F(k, l)}{D(k, l)} f\left(1 - \beta \frac{C(k, l)}{E(k, l)}\right) \quad \text{(Eq. 18)}$$

Figure 5:
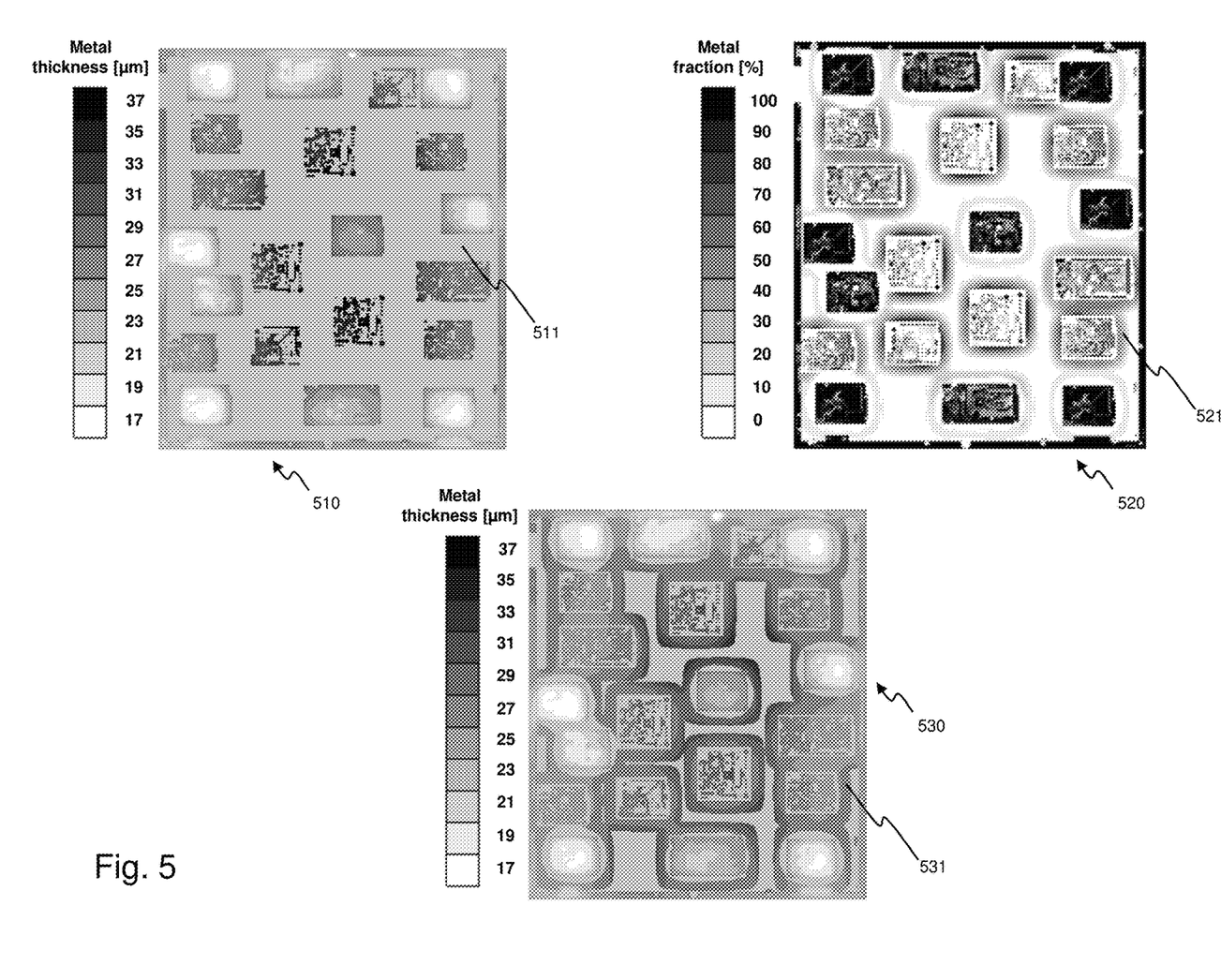
FIG. 5 shows plots of a PCB panel illustrating the balancing steps according to FIG. 4.

FIG. 5 illustrates different plots 510, 520, 530 as a result of the application of the steps according to FIG. 4 starting from the layout 100 as shown in FIG. 1. For this application, Eq. 15 was applied with α=3 and β=5. Plot 510 shows the simulated metal thickness before applying the balancing. The uniform areas 511 are areas with no metal at all, thus having no thickness values. This plot 510 shows that the metal thickness in the active areas ranges from 17 µm to 37 µm when no metal balancing is applied. Plot 520 shows the balancing fractions $\theta_b$(k, l) 207, 521 after application of step 406. Plot 530 shows the simulated thickness after application of the balancing fractions $\theta_b$(k, l) 521 to the layout. By the application of metal balancing 531 to the balancing areas, metal deposition is now observable in these balancing areas. As a result of the metal balancing, the metal thickness range has decreased to a range of 17 µm to 31 µm in almost all active areas.

Figure 6:
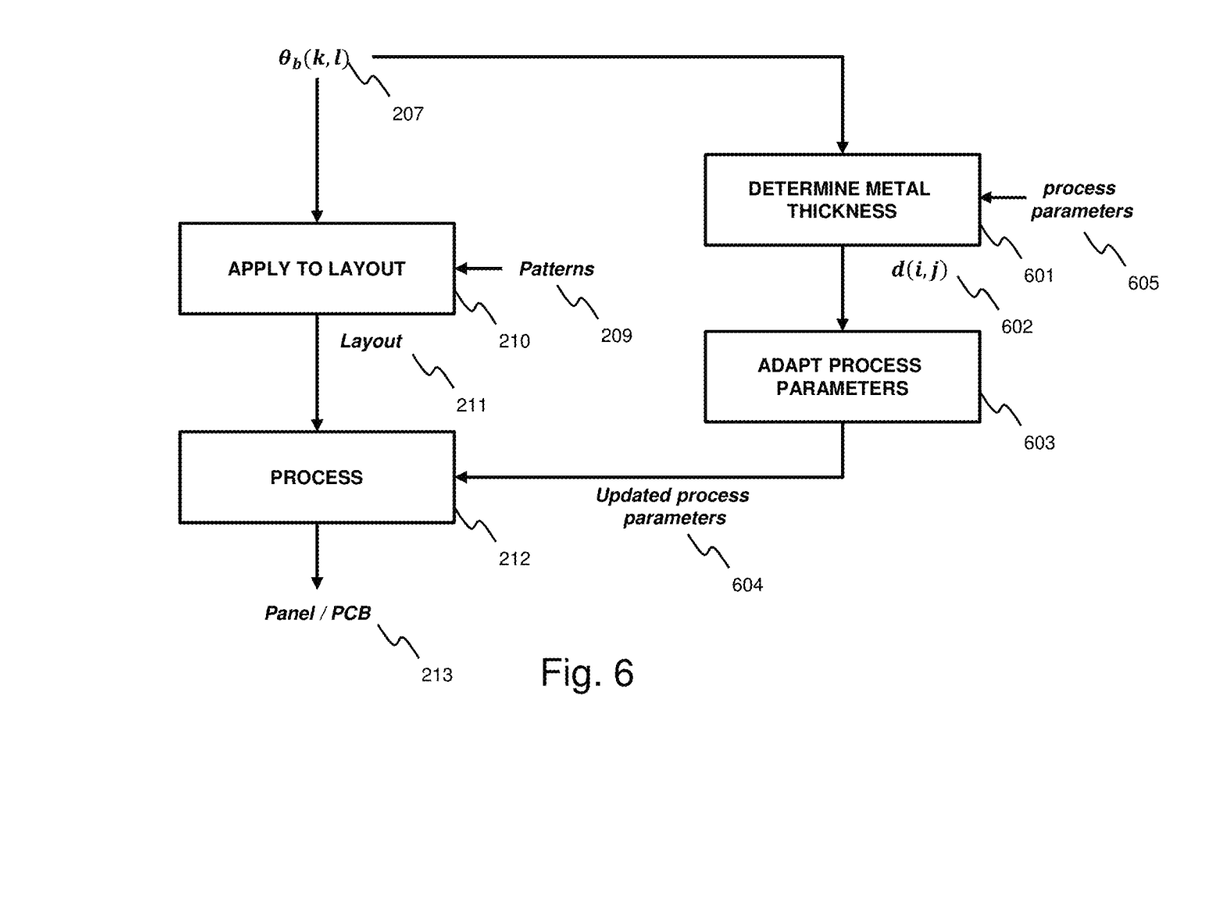
FIG. 6 shows steps for further optimizing the process parameters for electrochemical deposition of metal on a substrate according to an example embodiment.

FIG. 6 illustrates further steps 601, 603 that may be performed when performing the balancing according to any of the above described embodiments. In FIG. 6 the already described steps 210 and 212 are illustrated. Next to applying the balancing fractions 207 to the layout according to step 210, these fractions 207 may also be used to simulate the thickness 602 of the metal according to a parallel step 601. To do so, the process parameters 605 intended for the electrochemical deposition are taken into account. This simulation will provide a thickness range 602 for the metal in the active areas. This range will normally be smaller than the initial range before applying the balancing, e.g. the range obtained from step 203. Because of the smaller range, the process parameters 605 may be further adapted to shift the range towards a more preferred or optimal range without leaving a range that is required by the final panel or PCB product. The so-obtained adapted process parameters 604 are then used for the final electrochemical deposition step 212 resulting in a metal deposition within the optimized thickness range.

Figure 7:
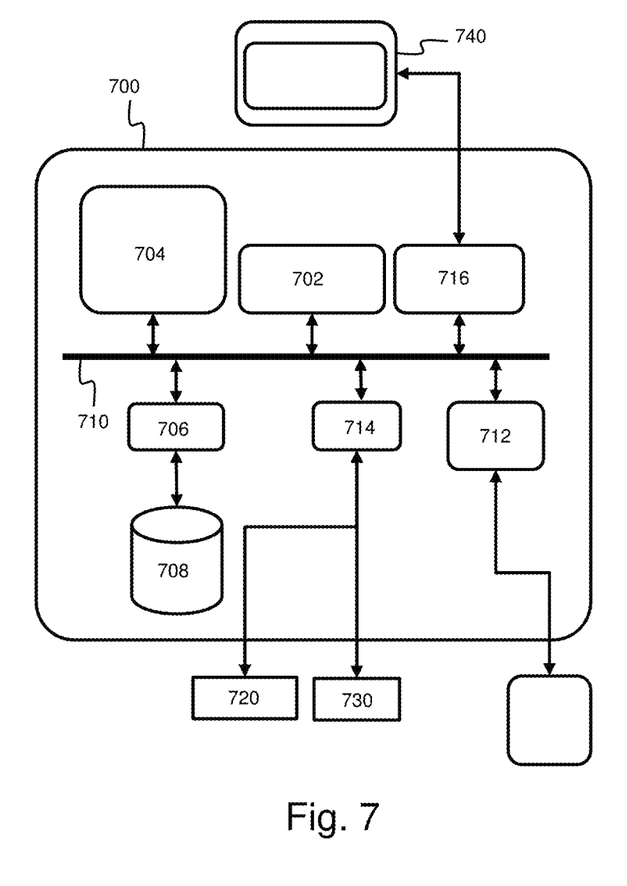
FIG. 7 shows an example embodiment of a suitable computing system for performing one or several steps in embodiments of the invention.

FIG. 7 shows a suitable computing system 700 for performing steps according to the above described embodiments. Computing system 700 may in general be formed as a suitable general-purpose computer and comprise a bus 710, a processor 702, a local memory 704, one or more optional input interfaces 714, one or more optional output interfaces 716, a communication interface 712, a storage element interface 706, and one or more storage elements 708. Bus 710 may comprise one or more conductors that permit communication among the components of the computing system 700. Processor 702 may include any type of conventional processor or microprocessor that interprets and executes programming instructions. Local memory 704 may include a random-access memory (RAM) or another type of dynamic storage device that stores information and instructions for execution by processor 702 and/or a read only memory (ROM) or another type of static storage device that stores static information and instructions for use by processor 702. Input interface 714 may comprise one or more conventional mechanisms that permit an operator or user to input information to the computing device 700, such as a keyboard 720, a mouse 730, a pen, voice recognition and/or biometric mechanisms, a camera, etc. Output interface 716 may comprise one or more conventional mechanisms that output information to the operator or user, such as a display 740, etc. Communication interface 712 may comprise any transceiver-like mechanism such as for example one or more Ethernet interfaces that enables computing system 700 to communicate with other devices and/or systems, for example with other computing devices. The communication interface 712 of computing system 700 may be connected to such another computing system by means of a local area network (LAN) or a wide area network (WAN) such as for example the internet. Storage element interface 706 may comprise a storage interface such as for example a Serial Advanced Technology Attachment (SATA) interface or a Small Computer System Interface (SCSI) for connecting bus 710 to one or more storage elements 708, such as one or more local disks, for example SATA disk drives, and control the reading and writing of data to and/or from these storage elements 708. Although the storage element(s) 708 above is/are described as a local disk, in general any other suitable computer-readable media such as a removable magnetic disk, optical storage media such as a CD or DVD, -ROM disk, solid state drives, flash memory cards, . . . could be used.

As used in this application, the term "circuitry" may refer to one or more or all of the following:

(a) hardware-only circuit implementations such as implementations in only analogue and/or digital circuitry and (b) combinations of hardware circuits and software, such as (as applicable):

(i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A computer-implemented method for balancing an electrochemical deposition of metal on a PCB substrate, the method comprising:
    obtaining a layout of the metal on the PCB substrate comprising at least one active area having a circuit layout and a balancing area available for the balancing;
    dividing an area of the substrate into a plurality of finite elements;
    determining active metal fractions from the layout for the respective finite elements;
    determining metal balancing fractions covering respective finite elements in the balancing area based on the active metal fractions in finite elements in the at least one active area surrounding the respective finite element.

2. The method according to claim 1 further comprising:
    adapting the layout in the balancing area according to the determined metal balancing fractions.

3. The method according to claim 2, wherein the adapting further comprises:
    selecting patterns for respective finite elements in the balancing area having the respective metal balancing fractions, and
    adding the selected patterns to the layout.

4. The method according to claim 1, wherein determining the balancing fractions is performed such that a lower active metal fraction for a respective surrounding finite element in the active area contributes more to the metal balancing fraction than a higher active metal fraction.

5. The method according to claim 1, wherein determining the balancing fractions is performed such that a respective surrounding finite element in the active area contributes less to the metal balancing fraction, the larger its distance to the respective finite element in the balancing area.

6. The method according to claim 1, wherein determining the balancing fractions is performed such that a respective surrounding finite element in the active area contributes more to the balancing fraction when the respective finite element in the balancing area is located closer to a border of the layout.

7. The method according to claim 1, further comprising:
    simulating an average thickness of the metal covering the finite elements when performing the electrochemical deposition according to the obtained layout; and
    wherein determining the balancing fractions is performed such that a higher simulated average thickness of the metal in a respective surrounding finite element in the active area contributes more to the balancing fraction than a smaller simulated average thickness.

8. The method according to claim 1 further comprising:
    simulating an average optimized thickness of the metal covering the finite elements when performing the electrochemical deposition for the layout according to the determined balancing fractions;
    adapting process parameters of the electrochemical deposition such that the average optimized thickness of the metal falls within a predetermined thickness range.

9. The method according to claim 1 wherein determining the balancing fractions is performed such that a respective surrounding finite element in the active area contributes less to the balancing fraction when more surrounding finite elements in the balancing area are available.

10. A controller comprising at least one processor and at least one memory including computer program code, the at least one memory and computer program code configured to, with the at least one processor, cause the controller to perform the method according to claim 1.

11. A non-transitory computer readable storage medium comprising computer-executable instructions for performing the method according to claim 1 when the instructions are run on a computer.

12. A method for manufacturing a PCB panel by electrochemical deposition of a metal comprising:
    obtaining a layout of the metal on a PCB substrate comprising at least one active area having a circuit layout and a balancing area available for balancing an electrochemical deposition of metal on a PCB substrate;
    dividing an area of the PCB substrate into a plurality of finite elements;
    determining active metal fractions from the layout for the respective finite elements;
    determining metal balancing fractions covering respective finite elements in the balancing area based on the active metal fractions in the finite elements in the at least one active area surrounding the respective finite element;
    adapting the layout in the balancing area according to the determined metal balancing fractions;
    manufacturing the PCB panel according to the adapted layout.

* * * * *